United States Patent [19]
Kelley

[11] 4,222,482
[45] Sep. 16, 1980

[54] CONVEYOR FOR HANDLING FREE-FLOWING MATERIAL

[76] Inventor: Hugh D. Kelley, 1451 Morgantown, Wichita, Kans. 67212

[21] Appl. No.: 927,354

[22] Filed: Jul. 24, 1978

[51] Int. Cl.³ ............................................. B65G 19/30
[52] U.S. Cl. ............................... 198/721; 198/735; 198/841; 198/957
[58] Field of Search ............... 198/735, 841, 957, 734, 198/731, 721, 831; 52/573, 506

[56] References Cited

U.S. PATENT DOCUMENTS

| | | | |
|---|---|---|---|
| 1,511,221 | 10/1924 | Joy | 198/731 X |
| 2,362,252 | 11/1944 | Ellinwood | 52/573 X |
| 3,556,570 | 1/1971 | Cosenza | 52/573 |
| 3,788,455 | 1/1974 | Dielkmann | 198/831 |

OTHER PUBLICATIONS

Hunter Catalogue, "Flow Master Conveyor", pp. 49-52, Hunter Mfg. Inc., 8/25/1977.

*Primary Examiner*—Robert B. Reeves
*Assistant Examiner*—Douglas D. Watts
*Attorney, Agent, or Firm*—Edwin H. Crabtree

[57] ABSTRACT

A conveyor for handling free-flowing material such as grain products or the like. The conveyor characterized by having a bottom liner and side liners. The liners are replaceable and greatly increase the wear life of a conveyor housing. The liners also reduce drag and wear on an endless chain and flights attached thereto while reducing horsepower requirements in the conveying of the material.

8 Claims, 9 Drawing Figures

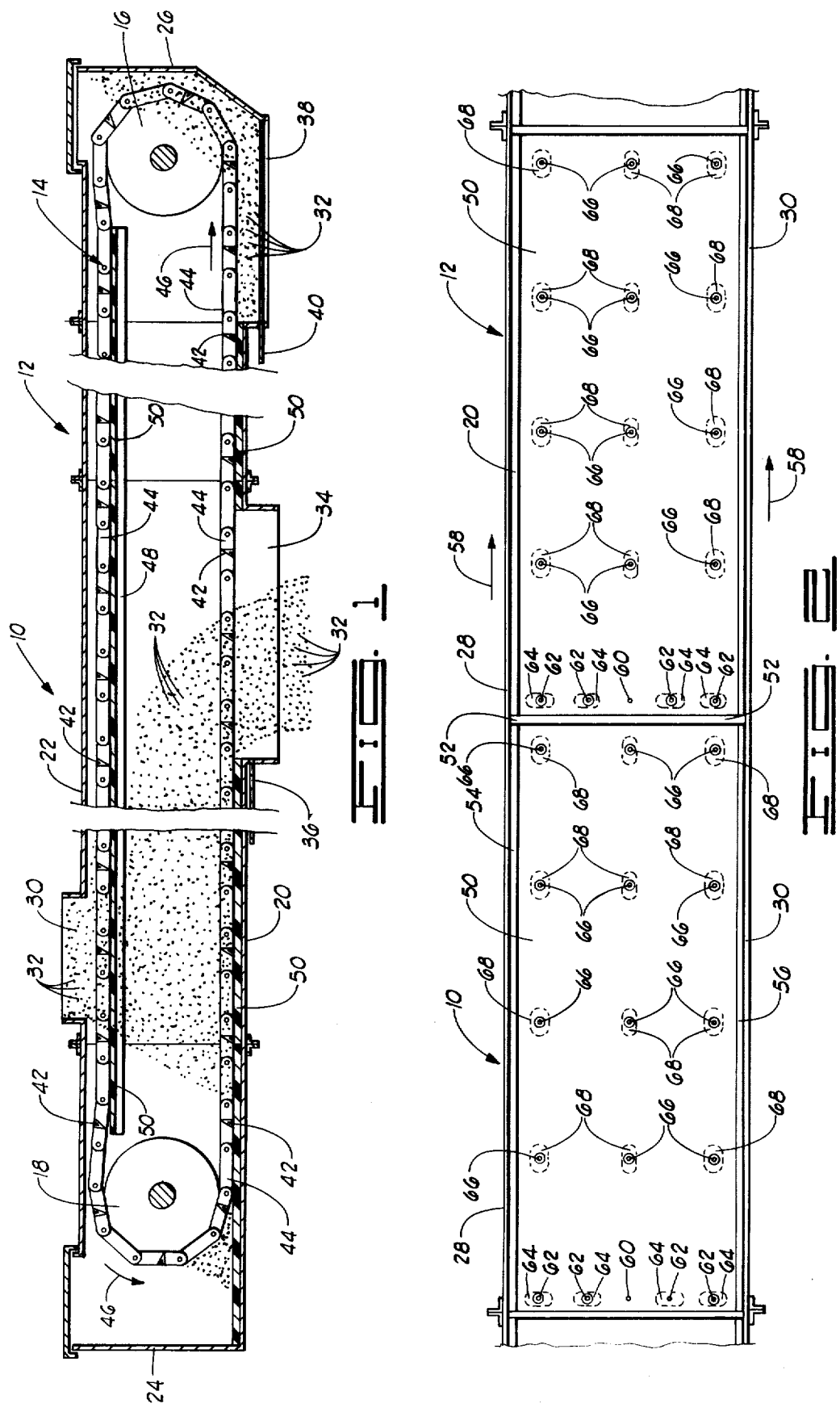

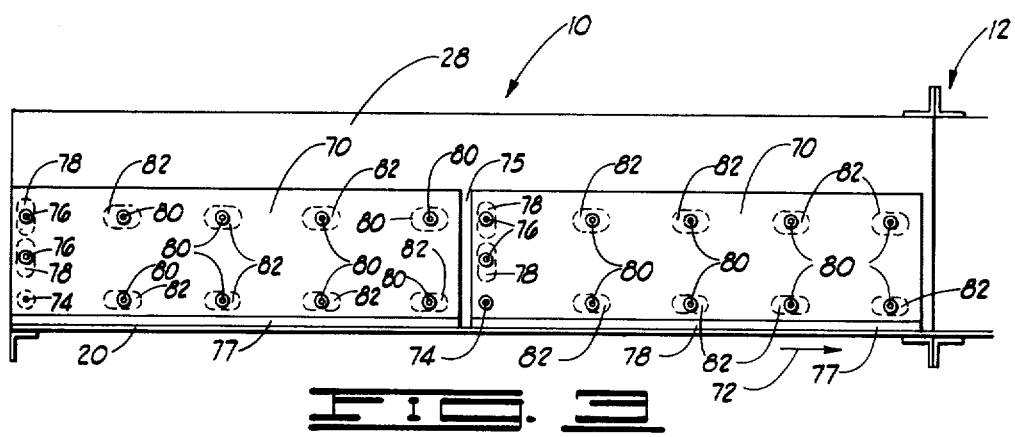
FIG. 3
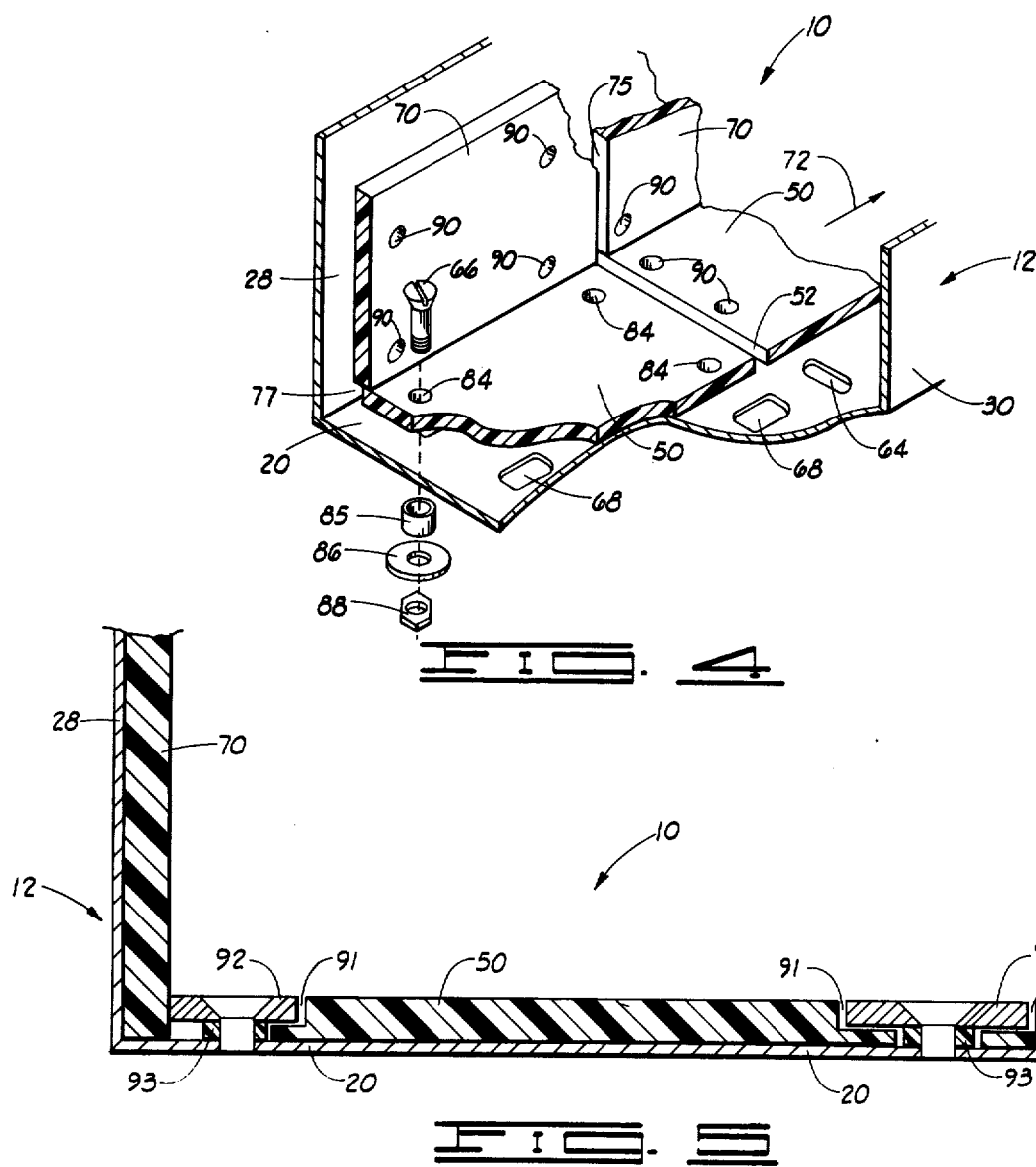
FIG. 4
FIG. 5

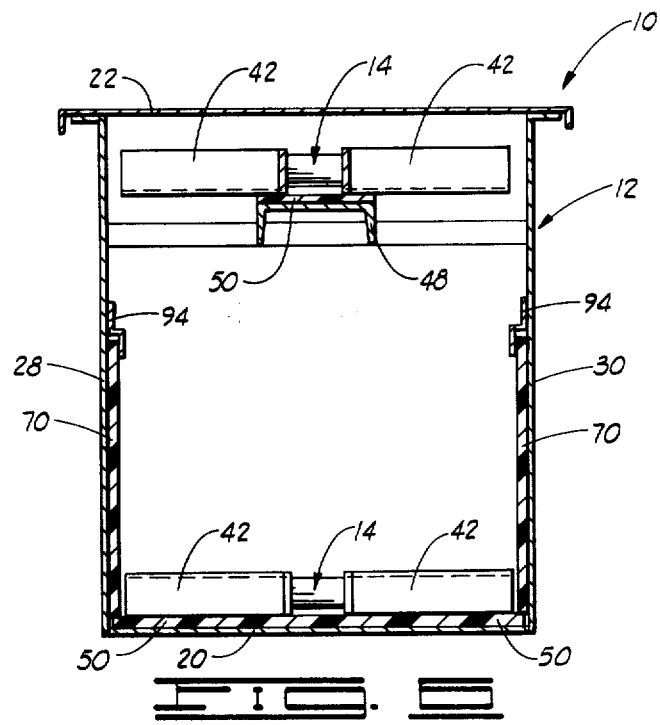
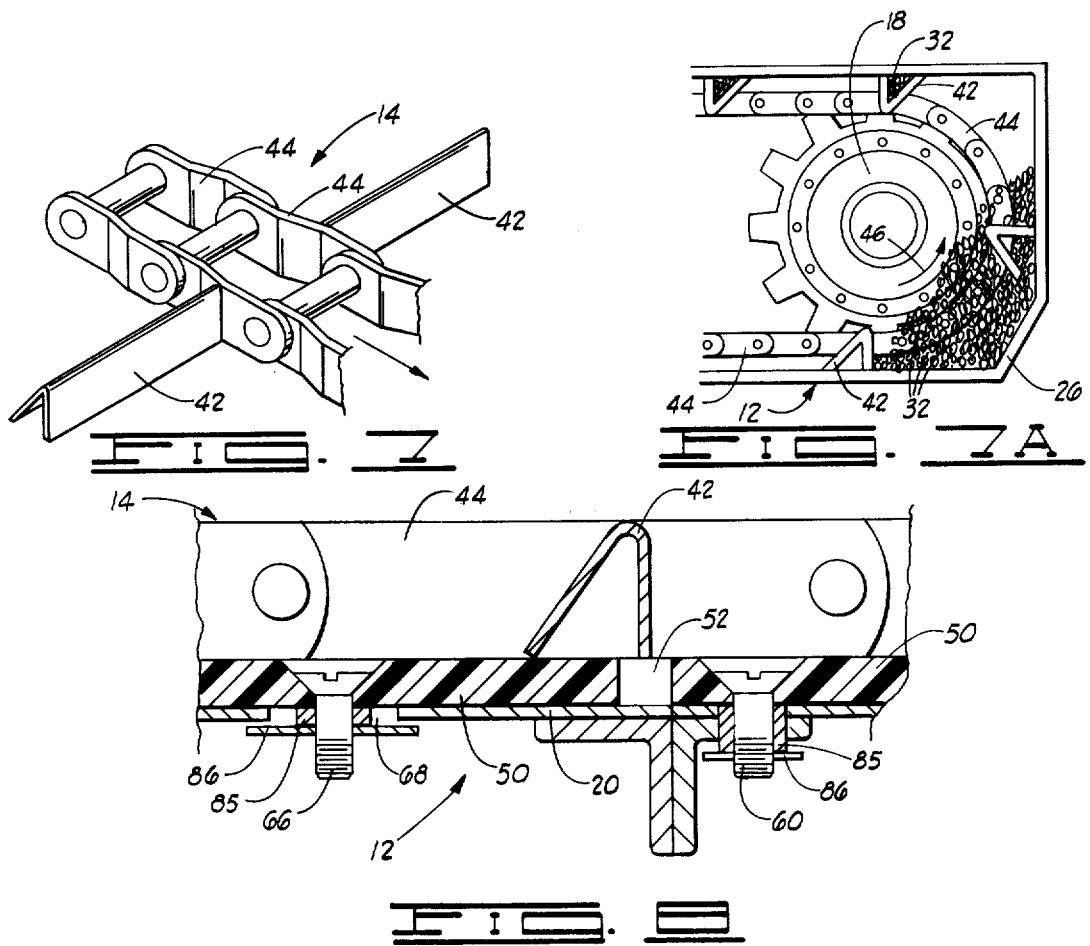
FIG. 6
FIG. 7
FIG. 7A
FIG. 8

CONVEYOR FOR HANDLING FREE-FLOWING MATERIAL

BACKGROUND OF THE INVENTION

The subject invention relates generally to an improved conveyor for handling materials and more particularly, but not by way of limitation, to a conveyor having liner material for greatly increasing the wear life of the conveyor.

Heretofore, there have been various types of material handling conveyors and transfer systems having chain, cable and belt drives. These systems, when required, have used metal liners or other types of material to reduce wear on the bottom of the conveyor housing.

With the advent of new synthetic wear-resistant materials marketed in sheet form, it has been found advantageous to use these materials as liners for material-handling conveyors. This sheet material is commonly referred to as ultra-high molecular weight polymers and called UHMW polyethylene lining material. The UHMW lining material offers approximately seven times increased wear life when compared to standard sheet steel material used in conveyor housing construction. But, an inherent problem with the UHMW liner material is that it expands and contracts with changes in the ambient temperature approximately ten times more than the standard sheet steel material. This problem of expansion and contraction of conveyor liner material is solved by the subject invention.

SUMMARY OF THE INVENTION

The subject invention provides a bottom liner and side liners which are replaceably mounted in a conveyor housing for greatly increasing the wear life of the conveyor housing and reducing drag on the endless chain and flights used in conveying the material.

Through the use of UHMW polyethylene liner material, the use of metal lining material is eliminated and potential sparks from metal-to-metal contact are prevented which could cause a fire or explosion. Also, the liner material reduces noise normally caused by the chain and flights dragging on the metal conveyor housing.

The conveyor also provides means for allowing the bottom liner and side liners to expand and contract with the changes in the ambient temperature so that the liner does not buckle or become distorted when attached to the conveyor housing.

Because the new improved conveyor liners reduce drag on the chain and flights, horsepower requirements in driving the endless chain are greatly reduced thereby improving the efficiency of the conveyor.

The conveyor further includes cupped V-shaped flights attached to the endless chain. The V-shaped flights not only move material along the length of the conveyor housing but when rotated 180° over the sprocket act as cups for recycling carry-over material thereby eliminating the problem of carry-over at intermediate discharge points.

The conveyor for handling free-flowing material such as grain products includes an enclosed elongated conveyor housing having a bottom portion and side portions. An endless chain having cupped V-shaped flights is attached to and received in the conveyor housing. A drive means for engaging and driving the chain thereon is attached to the side portions of the housing. A conveyor bottom liner is positioned on top of the bottom portion of the conveyor housing. Conveyor side liners are positioned adjacent the side portions of the conveyor housing. Attachment means for securing the liners to the bottom portion and the side portions is used for securing the liners to the housing and allowing the liners to expand and contract on the housing.

The advantages and objects of the invention will become evident from the following detailed description of the drawings when read in connection with the accompanying drawings which illustrate preferred embodiments of the invention.

BRIEF DESCRIPTION OF THE DRAWINGS

In FIG. 1, a side sectional view of the conveyor housing is illustrated.

FIG. 2 is a top view of a pair of bottom liners attached to the bottom portion of the conveyor housing.

FIG. 3 is a side view of a pair of side liners attached to the side portion of the conveyor housing.

FIG. 4 is a perspective view of a portion of the conveyor housing illustrating the bottom and side liners attached to the conveyor housing.

FIG. 5 is a partial front cross sectional view of the conveyor housing with the side and bottom liners attached to the housing.

FIG. 6 is a front sectional view of the conveyor housing.

FIG. 7 is a perspective view of the cupped V-shaped flights attached to the endless chain.

FIG. 7A is a side sectional view of the flights picking up carry-over material in the head section of the conveyor.

FIG. 8 is a partial side sectional view of the chain and flight disposed on top of the bottom liner.

DETAILED DESCRIPTION OF THE DRAWINGS

In FIG. 1, the improved conveyor for handling free-flowing material is designated by general reference numeral 10. The conveyor 10 includes an enclosed elongated conveyor housing 12, an endless chain 14, a drive sprocket 16 and an idle sprocket 18. The chain 14 is received on the sprockets 16 and 18 and driven thereon.

The conveyor housing 12 includes a bottom portion 20, a top portion 22, a tail section 24, a head section 26, and side portions 28 and 30. The side portions 28 and 30 are shown in FIG. 2.

The top portion 22 of the conveyor housing 12 includes an intake feed port 30 for receiving free-flowing material such as grain products or the like, and indicated by a plurality of dots 32. The material 32 is discharged through the intake feed port 30 through the top run of the endless chain 14, and onto the bottom run of the endless chain 14 riding on top of the bottom portion 20 of the housing 12.

The bottom portion 20 of the housing 12 includes an intermediate discharge port 34 for discharging the material 32 from the conveyor 10. While port 34 is shown, it should be appreciated that there may be a number of different types and numbers of intermediate ports. The intermediate discharge port 34 includes a sliding gate 36 shown in an open position. The bottom portion 20 of the housing 12 also includes a head discharge port 38 having a sliding gate 40 shown in a closed position. The gate 40 is opened so that material 32 is discharged out discharge port 38.

The endless chain 14 mounted on the drive sprocket 16 and sprocket pulley 18 includes a plurality of cupped V-shaped flights 42. The flights 42 are attached at one end to the opposite sides of individual chain lengths 44 used in making up the endless chain 14. Flights 42 are in an inverted position when the endless chain 14 is adjacent the bottom portion 20 of the housing 12. The direction of the endless chain 14 is indicated by arrows 46. As the cupped V-shaped flights 42 rotate 180° on the drive sprocket 16, the flights 42 act as cups for picking up carry-over material which was not discharged out port 34. Heretofore, carry-over material riding on top of the chain and flights could be several bushels per hour. This material was discharged through discharge port 38 and contaminating the material previously discharged through discharge port 38. The cupped flights 42 eliminate the carry-over problem by picking up the material, carrying it to the tail section 24 and then recycling the material out the port 34.

The top of the endless chain 14 is supported on a chain return support 48 which extends along the length of the conveyor housing 12.

To eliminate wear on the bottom portion 20 of the carrier housing 12 and also wear on the chain return support 48, a plurality of removable bottom liners 50 of UHMW liner material are attached to the top of the bottom portion 20 of the housing 12 and the top of the chain return support 48.

It should be noted in FIG. 1 the conveyor 10 is shown in three broken sections since the conveyor 10 can be of various lengths and it would be difficult to illustrate the overall length of the conveyor 10 in cross section, except as shown.

In FIG. 2, a partial top view of the bottom portion 20 of the housing 12 is illustrated with a pair of bottom liners 50 mounted on top of the bottom portion 20. As mentioned above, the liner material 50 has the inherent problem of expanding and contracting due to changes in the ambient temperature which must be compensated for when installing in a conveyor 10, as shown. Therefore, means for securing the bottom liners 50 is provided so that it may contract and expand without buckling or distorting causing damage to the chain 14 and flights 42 and hindering the travel of the endless chain 14 and flights 42 as they travel on the top thereof.

A space 52 is provided between the ends of the bottom liners 50 so that the liners 50 can expand lengthwise and sufficient space is provided so that the ends of the liners 50 do not contact each other. Also, a space 54 and a space 56 is provided between the sides of the liners 50 and the side portions 28 and 30 so that sufficient room is provided to allow for the lateral expansion of the sheets 50.

The direction of travel of the endless chain 14 is indicated by arrows 58. The upstream end of the liners 50 are attached firmly to the bottom portion 20 by a bolt 60. Extending laterally from the opposite sides of the rigid bolt 60 are a plurality of bolts 62 with the ends of the bolts 62 received in elongated slots 64 depicted in dotted lines. The slots 64 are in the bottom portion 20 of the housing 12 and allow the bolts 62 to move laterally when the sheet 50 expands and contracts. Extending downstream from the bolts 60 and 62, are a plurality of bolts 66 in a spaced relationship to each other and along the length of the liner 50. The bolts 66 are mounted lengthwise and laterally in a spaced relationship across the bottom liner 50 with the ends of the bolts 66 received in slots 68, shown in dotted lines. The slots 68 are through the bottom portion 20 of the housing 12 and are sufficient in size to allow the bolts 66 to move in all directions in the plane of the liner 50 so that as the liner 50 expands and contracts, the bolts 66 may move accordingly in the slots 68 while still retaining the liner 50 on the top of the bottom portion 20 of the housing 12. As mentioned above, by allowing the liner 50 to move both laterally and lengthwise, the liner 50 is prevented from buckling or distorting which would cause an irregular surface as the endless chain 14 and flights 42 ride thereon. Should there be an irregular surface on the liner 50, the chain 14 and flights 42 could drag, bend, or cause the liner 50 to be pulled loose from the housing 12.

In FIG. 3, a pair of removable side liners 70 are mounted on side portion 28 of the housing 12. Liners 70 are also mounted on the opposite side portion 30, shown in FIG. 2. The liners 70 are also made of the UHMW liner material and again, means is provided for the side liners 70 to expand and contract on the side portions 28 and 30. The side liners 70 are used to eliminate wear on the side portions 28 and 30 of the housing 12 when in the past the material conveyed and the ends of the flights 42 dragged against the sides of the side portions 28 and 30.

The direction of travel of the endless chain 14 is indicated by arrow 72. In the upstream lower corner of the liners 70 is mounted a rigid bolt 74 which is received through the liner 70 and the side portion 28 for securing the liner 70 thereto. The two liners 70 are mounted on the side portion 28 with a gap 75 therebetween so that the liners 70 expand lengthwise and the ends of the liners 70 do not contact each other. Also, at the bottom of the liner 70 is a gap 77 provided so that again as the liners 70 expand, the bottom of the liners 70 do not contact the bottom portion 20 of the housing 12. Extending laterally and upward from the rigid bolt 74 is a pair of bolts 76 received in lateral slots 78 in the side portion 28 which allow the liner 70 to expand laterally with the bolts 76 moving laterally in the slots 78. Extending downstream and along the length of the liner 70 is a plurality of bolts 80 in a spaced relationship to each other. The bolts 80 are received in slots 82, shown in dotted lines, which extend through the side portion 28 and are of sufficient width to allow the bolts 80 to move, and in all directions, in the plane of the liner 70 so that the liners 70 can expand and contract on the side portion 28.

In FIG. 4, a perspective view of the conveyor housing 12 with a portion of the bottom liner 50 and side liner 70 is shown. In this view, the slots 64 and slots 68 can be seen in the bottom portion 20 of the housing 12. Also, one of the bolts 66 can be seen in a position for receipt through an aperture 84 in the bottom liner 50. The bolt 66 is attached to a spacer 85, a washer 86, and a threaded nut 88.

In FIG. 5, an alternate method of attaching the bottom liner 50 to the bottom portion 20 of the housing 12 is illustrated. This method could also be used in attaching the side liner 70 to the side portion 28. An angular-shaped groove 91 is made in the edge of the liner material 50 which is greater than the width of a metal retainer 92. The bolts 66 are then received through the metal retainer 92, a spacer 93, and attached to the bottom portion 20. Since the groove 91 is greater than the overall width of the metal retainer 92, the liner 50 may move both laterally and lengthwise when the liner 50 expands and contracts on the bottom portion 20 of the housing 12.

In FIG. 6, a front sectional view of the conveyor 10 is seen. In this view, a pair of flights 42 can be seen extending outwardly from the endless chain 14. The chain 14 is shown riding on top of the bottom liner 50 mounted on top of the chain return support 48 and the bottom liner 50 mounted on top of the bottom portion 20 of the housing 12. Also shown in this view are the side liners 70 attached to the side portions 28 and 30 with the top of the liners 28 and 30 held by side liner retainers 94. The ends of the flights 42 are also shown adjacent the side liners 70 with sufficient space provided therebetween so that as the chain 14 rides on top of the liner 50, the ends of the flights 42 do not rub or drag against the side liners 70.

In FIG. 7, an enlarged perspective view of the chain 14 and flights 42 are shown. One end of the flights 42 are shown attached to the opposite sides of chain links 44 and extend outwardly therefrom. The front of the flights 42 contact the material 32 when received on top of the liner 50 with the flights 42 transporting the material 32 on top of the liner 50 and discharging it out the intermediate discharge port 34, shown in FIG. 1.

FIG. 7A is an enlarged side view of the head section 26 of the housing 12. In this view, the cupped flights 42 can be seen picking up the carry-over material 32 in the head section 26 and recycling the material 32 back to the intermediate discharge port 34 where it is discharged out the conveyor 10. As mentioned in the discussion under FIG. 1, the unique design of the cupped flights 42 eliminates the problem of excessive build-up of the material 32 in the head section 26 of the housing 12.

In FIG. 8, a partial side sectional view of the chain 14 is shown disposed on top of the bottom liner 50 with the flight 42 extending outwardly therefrom. This figure is shown to illustrate that the overall width of the cupped V-shaped flight 42 when it rides on top of the liner 50 on the bottom portion 20 is sufficient enough so that it rides over the space 52 between the ends of the bottom liners 50. This feature is important since if the space 52 was greater in width than the width of the flight 42, the flight 42 could drop into the space 52 thereby causing the flight 42 to become engaged against the edge of the liner 50 which could possibly cause the flight 42 to become bent or the flight 42 could cause the liner 50 to become disengaged from the bottom portion 20 of the housing 12.

Also shown in FIG. 8 is a bolt 66 received through the liner 50 and in slot 68. Also shown is a rigid bolt 60 holding the upstream end of the bottom liner 50 on the right. The bolts 60 and 66 include spacers 85 and washers 86. The bolts 60 and 66 are secured to threaded nuts which are not shown, but are similar to the threaded nut 88 shown in FIG. 4.

Changes may be made in the construction and arrangement of the parts or elements of the embodiments as described herein without departing from the spirit or scope of the invention defined in the following claims.

What is claimed is:

1. A conveyor for handling free-flowing material such as grain products or the like, the conveyor comprising:
   an elongated conveyor housing having a bottom portion and side portions;
   and endless chain disposed above the bottom portion of said housing;
   drive means for engaging and driving said chain thereon, said drive means attached to the side portions of said conveyor housing;
   a plurality of conveyor bottom liners positioned on top of the bottom portion of said conveyor housing, said endless chain and said flights disposed on top of said bottom liners and riding thereon, said bottom liners laid end to end with a space therebetween sufficient to allow the liners to expand lengthwise and a space between the sides of said bottom liners and the side portion of said housing to allow said bottom liners to expand laterally;
   first attachment means for securing said bottom liners to the top of the bottom portion of said conveyor housing and providing means for expansion and contraction of said bottom liners on the bottom portion of said housing; and
   V-shaped flights attached to said endless chain, the width of the flights greater than the space between the ends of said bottom liners.

2. The conveyor as described in claim 1, wherein said first attachment means includes:
   a plurality of slots through the bottom portion of said housing and disposed in a spaced relationship to each other; and
   a plurality of bolts received through apertures in said bottom liners, said apertures in said bottom liners indexed above said slots, the ends of said bolts received through said slots, said slots having a width greater than the diameter of said bolts so that said bolts may move in said slots as said liners expand and contract on top of the bottom portion of said housing.

3. The conveyor as described in claim 1, further including:
   a plurality of conveyor side liners positioned along the inside of the side portions of said conveyor housing, said side liners disposed adjacent the ends of said flights as said endless chain and said flights ride on top of said bottom liners, said side liners laid end to end with a space therebetween sufficient to allow the side liners to expand lengthwise and a space between the sides of said side liners and the bottom portion of said housing to allow said side liners to expand laterally; and
   second attachment means for securing said side liners to the inside of the side portions of said conveyor housing and providing means for expansion and contraction of said side liners on the inside of the side portions of said housing.

4. The conveyor as described in claim 3, wherein said bottom liners and said side liners are angular sheets made of U.H.M.W. polyethylene.

5. The conveyor as described in claim 3, wherein said second attachment means includes:
   a plurality of slots through side portions of said housing and disposed in a spaced relationship to each other; and
   a plurality of bolts received through apertures in said side liners indexed with said slots, the ends of said bolts received through said slots, said slots having a width greater than the diameter of said bolts so that said bolts may move in said slots as said side liners expand and contract on the side portions of said housing.

6. A conveyor for handling free-flowing material, such as grain products or the like, the conveyor comprising:

an elongated conveyor housing having a bottom portion and side portions;

an endless chain disposed above the bottom portion of said housing;

drive means for engaging and driving said chain thereon, said drive means attached to the side portions of said conveyor housing;

a plurality of conveyor bottom liners postioned on top of the bottom portion of said conveyor housing, said endless chain disposed on top of said bottom liners and riding thereon, said bottom liners laid end to end with a space therebetween sufficient to allow said bottom liners to expand lengthwise and a space between the sides of said housing to allow said bottom liners to expand laterally;

first attachment means for securing said bottom liners to the top of the bottom portion of said conveyor housing and providing means for expansion and contraction of said bottom liners on the bottom portion of said housing;

a plurality of conveyor side liners positioned along the inside of the side portions of said conveyor housing, said side liners laid end to end with a space therebetween sufficient to allow the side liners to expand lengthwise and a space between the sides of said side liners and the bottom portion of said housing to allow the side liners to expand laterally;

second attachment means for securing said side liners to the inside of the side portions of said conveyor housing and providing means for expansion and contraction of said side liners on the inside of the side portions of said housing; and V-shaped flights attached to said endless chain, the width of the flights greater than the space between the ends of said bottom liners.

7. The conveyor as described in claim 6, wherein said bottom liners and said side liners are angular sheets made of U.H.M.W. polyethylene.

8. The conveyor as described in claim 6, wherein the upstream end of said conveyor bottom liners is rigidly secured to the bottom portion of said housing.

* * * * *